United States Patent
Thielert

(10) Patent No.: US 9,284,204 B2
(45) Date of Patent: Mar. 15, 2016

(54) METHOD AND APPARATUS FOR BIOLOGICALLY TREATING COKING-PLANT WASTEWATER

(75) Inventor: Holger Thielert, Dortmund (DE)

(73) Assignee: THYSSENKRUPP UHDE GMBH, Dortmund (DE)

(*) Notice: Subject to any disclaimer, the term of this patent is extended or adjusted under 35 U.S.C. 154(b) by 218 days.

(21) Appl. No.: 14/000,909

(22) PCT Filed: Apr. 2, 2012

(86) PCT No.: PCT/EP2012/055986
§ 371 (c)(1),
(2), (4) Date: Oct. 9, 2013

(87) PCT Pub. No.: WO2012/139917
PCT Pub. Date: Oct. 18, 2012

(65) Prior Publication Data
US 2014/0048480 A1    Feb. 20, 2014

(30) Foreign Application Priority Data
Apr. 11, 2011 (DE) .......... 10 2011 001 962

(51) Int. Cl.
*C02F 3/30* (2006.01)
*C02F 3/12* (2006.01)
(Continued)

(52) U.S. Cl.
CPC ............ *C02F 3/302* (2013.01); *C02F 3/1268* (2013.01); *C02F 3/1278* (2013.01); *C02F 3/301* (2013.01); *C02F 2101/101* (2013.01); *C02F 2101/18* (2013.01); *C02F 2101/345* (2013.01); *C02F 2103/10* (2013.01); *C02F 2103/365* (2013.01); *Y02W 10/15* (2015.05)

(58) Field of Classification Search
CPC ...... C02F 3/302; C02F 3/1268; C02F 3/1278; C02F 3/301; C02F 2101/101; C02F 2101/18; C02F 2101/345; C02F 2103/10; C02F 2103/365; Y02W 10/15
USPC ......... 210/605, 621, 623, 252, 259, 903, 904, 210/909
See application file for complete search history.

(56) References Cited

U.S. PATENT DOCUMENTS 4,271,013 A * 6/1981 Bhattacharyya ............. 210/617
6,433,055 B1   8/2002 Kleyer
(Continued)

FOREIGN PATENT DOCUMENTS

DE         19842332 A    3/2000
DE    202009013628 U1 *  3/2011
(Continued)

OTHER PUBLICATIONS

Machine-generated English Translation of DE 202009013628, generated on Jul. 11, 2015.*

*Primary Examiner* — Fred Prince
(74) *Attorney, Agent, or Firm* — Andrew Wilford

(57) ABSTRACT

The invention relates to a process for the biological purification of coking plant wastewater that is loaded with nitrogen compounds, cyanides, phenols and sulphides. The coking plant wastewater, for removal of pollutants that inhibit a nitrification, is fed together with a biomass-containing stream of matter to a detoxification reactor that has a gas-treatment zone and a reaction zone. The feed mixture supplied to the detoxification reactor is exposed in the gas-treatment zone to a gaseous oxidizing agent. A stream of matter enriched with the oxidizing agent is fed to the reaction zone in which cyanides and other pollutants inhibiting the nitrification are biodegraded. A stream of matter is withdrawn from the reaction zone and returned to the detoxification reactor. In addition, a wastewater stream from the detoxification reactor is separated by a membrane filtration into a biomass-containing retentate stream and a purified permeate stream. From the retentate stream, a substream which entrains excess sludge is discharged. The retentate stream, after separating off the substream, is recirculated to the detoxification reactor. The permeate stream is further purified by nitrification and subsequent denitrification.

13 Claims, 1 Drawing Sheet

(51) Int. Cl.
*C02F 101/10* (2006.01)
*C02F 101/18* (2006.01)
*C02F 101/34* (2006.01)
*C02F 103/10* (2006.01)
*C02F 103/36* (2006.01)

(56) References Cited

U.S. PATENT DOCUMENTS

| | | |
|---|---|---|
| 8,455,593 B2 | 6/2013 | Nakamura |
| 2002/0100718 A1* | 8/2002 | Yamasaki et al. ............ 210/143 |
| 2005/0115900 A1* | 6/2005 | Cote et al. .................... 210/636 |
| 2007/0012619 A1 | 1/2007 | Thielert |
| 2011/0282024 A1 | 11/2011 | Weissenbach |

FOREIGN PATENT DOCUMENTS

| | | |
|---|---|---|
| JP | 2011121111 B | 6/2010 |
| JP | 2011011527 B | 1/2011 |
| JP | 2011032455 B | 2/2011 |
| RU | 2049740 C1 * | 12/1995 |
| WO | 2011042476 A | 4/2011 |

* cited by examiner

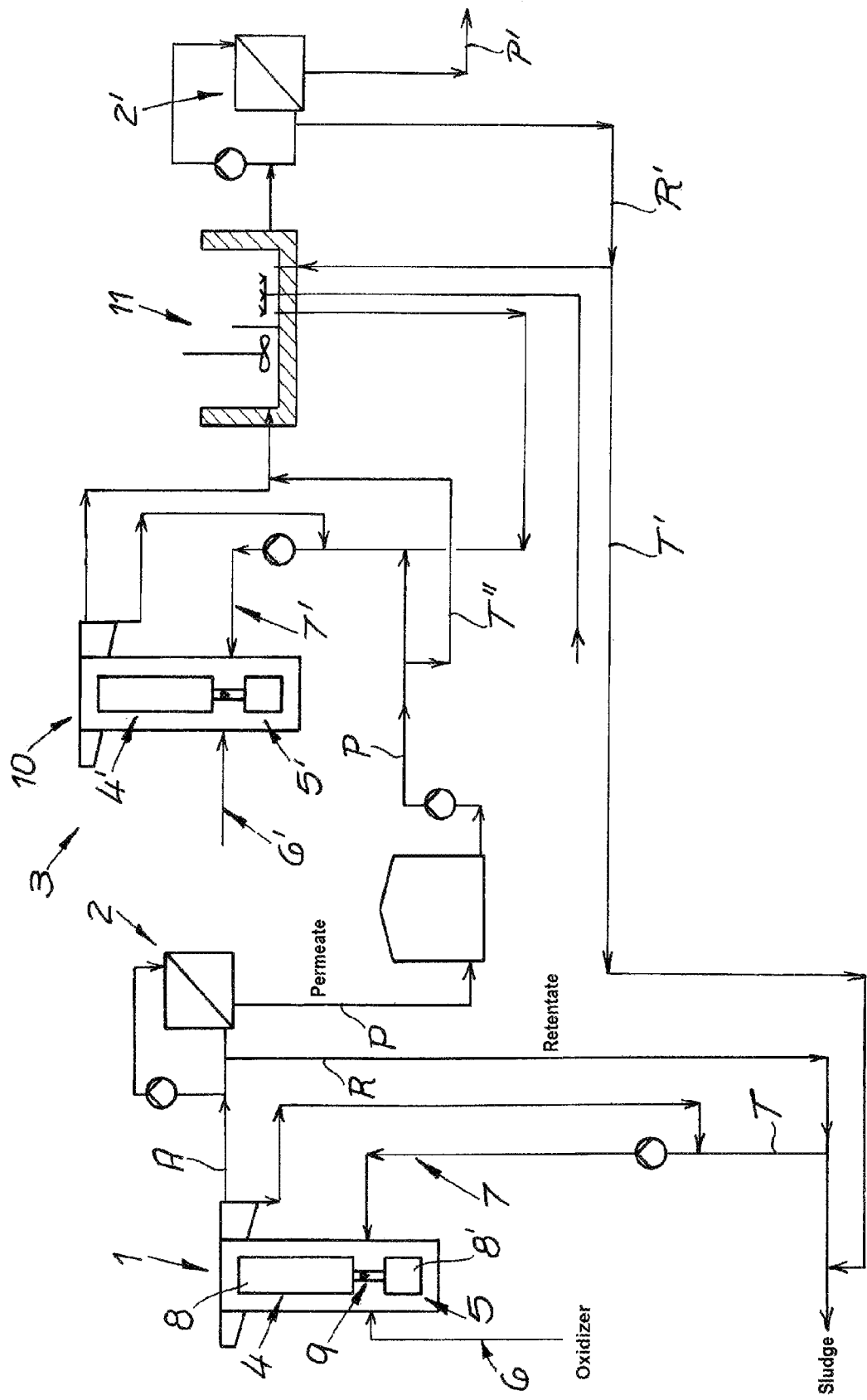

METHOD AND APPARATUS FOR BIOLOGICALLY TREATING COKING-PLANT WASTEWATER

CROSS REFERENCE TO RELATED APPLICATIONS

This application is the US-national stage of PCT application PCT/EP2012/055986 filed 2 Apr. 2012 and claiming the priority of German patent application 102011001962.6 itself filed 11 Apr. 2011.

FIELD OF THE INVENTION

The invention relates to a method of biologically treating coking-plant wastewater contaminated with nitrogen compounds, cyanides, phenols and sulfides, as well as an apparatus for implementing the method.

BACKGROUND OF THE INVENTION

Due to the high concentration of nitrification-inhibiting toxic materials in coking-plant wastewater from a coking-plant, it is among the most problematic of all industrial wastewater. For treatment with conventional biological methods, low-load, and therefore large-volume, bioreactors of a basin-type construction are necessary. Sensitive biological processes, for example nitrification, are always at risk of succumbing to sudden loads involving critical substances, such as cyanide and phenol. By dividing the treatment into a first biological step for degrading organic compounds, hydrolysis and denitrification and a second nitrification step, as well as by connecting these two steps by recycling nitrates, the space requirements for the bioreactors are reduced, and sensitive, slow-growing autotrophic bacteria are protected against harm from cyanide, phenol and other toxic agents.

Nevertheless, the needed space requirements as well as the sheer size of the concrete structures for this process are extraordinarily great, and therefore extremely costly. Due to spatial restrictions that are frequently encountered in coking plants, the described wastewater treatment method is not suited for use in existing coking plants.

DE 103 18 736 [US 2007/0012619] discloses a method of treating the wastewater from coking plants that provides for the untreated wastewater to flow through a reactor incorporated in fluid circulation path and that contains membrane tubes that are gas-permeable, with an oxygen-containing gas flowing in and through them. A biofilm is maintained on the exterior of the membrane tubes bathed in fluid flowing therearound and is where a selective nitrification of nitrogen-containing compounds contained in the wastewater into nitrates occurs; plus, simultaneously, a denitrification of nitrates into elementary nitrogen occurs in an oxygen-poor outer area of the biofilm. This method has not been successful in practice. The formation and maintenance of the defined biofilm have proved difficult. Moreover, providing the necessary exchange areas for nitrification and denitrification on the membrane surfaces has proved difficult.

DE 198 42 332 discloses a method of biologically treating wastewater that uses a reactor including a gas-exposure zone for introducing a gaseous oxidizing agent into the untreated fluid and/or for the optimal supply of the biomass with wastewater, as well as a reaction zone for degrading pollutants. The fluid mixture is returned from the reaction zone to the gas-exposure zone and reconcentrated there with gas and substrate. This method provides for a strict separation between the gas-exposure zone where the gas is introduced into the fluid and mixed therewith and the reaction zone where the pollutants are biologically degraded. The method can be used for the biological treatment of municipal wastewater. In the case of treating wastewater from coking plants, the problem still remains that the coking-plant wastewater is loaded with pollutants that inhibit nitrification.

OBJECT OF THE INVENTION

In view of this background, it is object of the present invention to provide a method of biologically treating coking-plant wastewater that can be carried out in a compact apparatus and that can accommodate the limited available space in existing coking plants.

SUMMARY OF THE INVENTION

The method according to the invention provides that, to remove nitrification-inhibiting pollutants, wastewater from a coking plant is fed as a stream containing biomass to a detoxification reactor that has a gas-exposure zone and a reaction zone. The wastewater/biomass mixture fed to the gas-exposure zone is exposed to a gaseous oxidizing agent. The resulting stream concentrated with the oxidizing agent is routed to the reaction zone, where cyanide and other nitrification-inhibiting pollutants are biologically degraded. A stream is drawn off from the reaction zone and recirculated to the reactor. Furthermore, another stream of wastewater from the detoxification reactor is separated by membrane filtration into a retentate stream containing biomass and a treated permeate stream. A partial stream that entrains excess sludge is extracted from the retentate stream. After the separation of the partial stream, the retentate stream is recirculated to the detoxification reactor. The permeate stream undergoes final treatment by a nitrification process and a subsequent denitrification following the nitrification process.

The detoxification reactor is divided into a gas-exposure zone for introducing the gas into the fluid and/or for an optimal substrate supply of the biomass, as well as a reaction zone for degrading pollutants. The detoxification reactor constitutes a first treatment stage during which nitrification-inhibiting pollutants are degraded such that no further negative effects can be expected of them. The phenol as well as cyanide contents of the stream discharged from the detoxification reactor and subjected to membrane filtration can be reduced to levels below the concentration where they inhibit nitrification. Almost complete cyanide degradation, and for the most part complete phenol degradation, are possible. In addition, due to the biological treatment in the detoxification reactor, the COD [chemical oxygen demand] content is reduced by 60% to 80%. Organic nitrogen compounds are broken down such that almost all of the nitrogen is present as $NH_4$ during treatment in the detoxification reactor.

Activated sludge from municipal treatment facilities, adapted over the course of several weeks to the wastewater coming from coking plants, can be used as biomass for operation of the detoxification reactor.

The wastewater drawn off from the detoxification reactor is subsequently treated by membrane filtration. Membrane filtration is used to separate and reconcentrate the biomass. Preferably, the membrane filtration is an ultrafiltration using modules with fluid-flooded membranes. The overflow rate of the membranes can be adjusted by a fluid rate of flow that is circulated in the system. By controlling the inflow and outflow, it is possible to adjust the biomass content in the retentate stream continually drawn off to a defined value. The retentate is preferably recirculated to the detoxification reactor with a biomass content of 10 to 30 g/l.

The nitrification and denitrification afterward can be performed by classic basin technology with secondary treatment. According to a preferred embodiment of the invention, the nitrification is performed in a nitrification reactor that also includes a gas-exposure zone and a reaction zone, a stream from the reaction zone being recirculated to the gas-exposure zone and concentrated therein with a gaseous oxidizing agent as well as the released permeate stream. A further stream is circulated from the reaction zone of the nitrification reactor to a settling basin operated as the denitrification step. A stream that entrains biomass is recirculated from the denitrification step to the nitrification reactor. Also, a biologically treated stream of wastewater is drawn off from the denitrification step.

The biologically treated stream of wastewater, preferably, undergoes subsequent treatment by membrane filtration. The stream of wastewater therein is separated into the retentate stream that contains biomass and a treated permeate stream. A partial stream that entrains excess sludge is extracted from the retentate stream. After the separation of the partial stream, the retentate stream is recirculated to the denitrification step. The membrane filtration step downstream of the denitrification step is preferably operated via ultrafiltration, modules being used that have fluid-flooded membranes, and the overflow rate at the membranes is adjusted by a fluid rate of flow that is circulated in the system.

The reaction zone and the gas-exposure zone of the detoxification reactor as well as of the nitrification reactor are advantageously connected by a nozzle, where fluid from the supply is fed into the gas-exposure zone. Due to the flow generated inside the nozzle, fluid is entrained from the reaction zone. The reactors are operated such that there is a strict separation between the gas-exposure zone and the reaction zone, where the pollutants are biologically degraded. The gas-exposure zone and the reaction zone therein are connected to each other for the fluid transfer, but also for creating feedback. A part of the fluid circulates continually between the gas-exposure zone and the reaction zone, while, simultaneously, wastewater and biomass are added and treated water is discharged through an outlet.

A partial stream can be branched off from the permeate stream created by the membrane filtration downstream of the detoxification reactor and directly routed to the denitrification step. The partial stream can also be utilized as a carbon source during denitrification.

A plant according to the invention comprises a detoxification reactor for removing nitrification-inhibiting pollutants, an apparatus for membrane filtration of a stream of wastewater pretreated in the detoxification reactor, as well as an apparatus for the biological wastewater treatment of a permeate stream obtained from the membrane filtration step with nitrification and denitrification. The detoxification reactor includes the previously described structural setup, containing an upper reaction zone, a lower reaction zone and means for recirculating the fluid from the reaction zone to the gas-exposure zone.

The biological wastewater treatment apparatus provided downstream of the detoxification reactor preferably includes a nitrification reactor that also includes an upper [gas-exposure] reaction zone, a lower gas-exposure zone and a supply means for a gaseous oxidizing agent, as well as means for recirculating fluid from the reaction zone to the gas-exposure zone.

A respective loop is provided in the reaction zone and the gas-exposure zone of the detoxification reactor and/or the nitrification reactor for circulating the fluid therein. Provided between the two zones is a nozzle, where fluid from the return stream and the wastewater of the coking plant and/or a pretreated stream of wastewater from the detoxification reactor entrains fluid from the upper loop, conveying it to the gas-exposure zone.

A settling basin provided downstream of the nitrification reactor is operated as a denitrification step, and a stream containing biomass can be recirculated from the settling basin to the nitrification reactor. Advantageously, the denitrification step is membrane filtration of a treated stream of wastewater pulled out of the settling basin.

BRIEF DESCRIPTION OF THE DRAWING

The invention will be described below in further detail and illustrated based on a single FIGURE showing a single embodiment. The sole FIGURE is a schematic representation of an apparatus for biologically treating coking-plant wastewater polluted with nitrogen compounds, cyanides, phenols and sulfides.

SPECIFIC DESCRIPTION OF THE INVENTION

The plant shown in the FIGURE comprises a detoxification reactor 1 for removing nitrification-inhibiting pollutants, a membrane-filtration device 2 for a stream of wastewater pretreated in the detoxification reactor 1, as well as means 3 for biological wastewater treatment with nitrification and denitrification of a permeate stream P from the membrane filtration. The detoxification reactor 1 includes an upper reaction zone 4, a lower gas-exposure zone 5 with a supply means 6 for a gaseous oxidizing agent, as well as means 7 for recirculating liquid from the reaction zone 4 to the gas-exposure zone 5. Loops 8 and 8' in the reaction zone 4 and in the gas-exposure zone 5 of the detoxification reactor 1 circulate fluid therein. In addition, a nozzle 9 is provided between the two zones 4 and 5 where the recirculated fluid and the untreated coking-plant wastewater entrain fluid from the upper loop 8, conveying it to the gas-exposure zone 5.

For removing cyanide, phenol and any further nitrification-inhibiting pollutants, the coking-plant wastewater is routed to the detoxification reactor 1, together with a fluid stream that contains a biomass. The biomass supplied to the detoxification reactor 1 undergoes exposure to gas in the gas-exposure zone 5 with a gaseous oxidizing agent. A stream concentrated with the oxidizing agent, is supplied to the reaction zone 4 of the detoxification reactor 1, where cyanide and other nitrification-inhibiting pollutants are biologically degraded. A fluid stream is drawn off from the reaction zone 4 and recirculated to the detoxification reactor 1. Moreover, a stream of wastewater A from the detoxification reactor 1 is separated into a biomass-containing retentate stream R and a treated permeate stream P by membrane filtration. A partial stream T that entrains excess sludge is extracted from the retentate stream R. After separation of the partial stream T, the retentate stream R is recirculated to the detoxification reactor 1. The permeate stream P is treated by nitrification first, then by denitrification.

The biological wastewater treatment apparatus 3 downstream of the detoxification reactor 1 includes a nitrification reactor 10 that also includes an upper reaction zone 4', a lower gas-exposure zone 5' with supply means 6' for a gaseous oxidizing agent, as well as means 7' for recirculating fluid from the reaction zone 4' to the gas-exposure zone 5'. A stream is recirculated from the reaction zone 4' to the gas-exposure zone 5' and concentrated therein with a gaseous oxidizing agent, as well as the fed-in permeate stream P. A further stream is routed from the reaction zone of the nitrification reactor to a settling basin 11, operated as a denitrification step. A stream entraining biomass is recirculated from the denitrification step to the nitrification reactor 10. Furthermore, a biologically treated stream of wastewater is drawn off from the denitrification step and routed to a membrane filter 2' downstream. The stream of wastewater is separated by the membrane filter 2' into a retentate biomass-containing stream R' and a treated permeate stream P'. A partial stream T' that entrains excess sludge is separated from the retentate stream R'. After separating this partial stream T, the retentate stream R' is recirculated to the denitrification step.

The schematic, as represented in the FIGURE, shows that a partial stream T" can be branched off and routed directly to the denitrification step from the permeate stream P generated by membrane filtration downstream of the detoxification reactor 1. The partial stream T" can be utilized as a source of carbon for the denitrification.

The biological wastewater treatment as shown in the FIGURE comprises a membrane filtration means 2 downstream of the detoxification reactor 1, and a further membrane filtration device 2' for the settling basin 11 operated as a denitrification step. The membrane filtration means 2 and 2' are preferably operated as ultrafiltration devices with modules with fluid-flooded membranes being used. The overflow rate on the membrane can be adjusted by a fluid rate of flow circulated within the system. By controlling inflow and outflow, it is possible to influence the thickening, meaning the biomass content, of the retentate streams R and R'.

The invention claimed is:

1. A method of biologically treating coking-plant wastewater contaminated with nitrogen compounds, cyanides, phenols and sulfides, the method comprising the steps of:
   for removing nitrification-inhibiting pollutants, mixing the coking-plant wastewater with a biomass-containing material and feeding the mixture of wastewater and biomass to a detoxification reactor having a gas-exposure zone and a reaction zone,
   exposing the mixture fed to the detoxification reactor to a gaseous oxidizing agent in the gas-exposure zone and feeding the resultant mixture with the oxidizing agent to the reaction zone where cyanide and other nitrification-inhibiting pollutants are degraded so as to detoxify the mixture,
   drawing off a portion of the detoxified mixture from the reaction zone and recirculating the drawn-off portion to the detoxification reactor,
   separating a stream of the detoxified mixture from the detoxification reactor by membrane filtration into a biomass-containing retentate stream and a treated permeate stream,
   extracting excess sludge from the retentate stream and recirculating the resultant sludge-free retentate stream to the detoxification reactor, and
   treating the permeate stream by nitrification and subsequent denitrification.

2. The method according to claim 1, further comprising the step of:
   using activated sludge from municipal treatment plants adapted over several weeks to coking-plant wastewater as biomass for the operation of the detoxification reactor.

3. The method according to claim 1, wherein the nitrification is effected in a nitrification reactor that includes a gas-exposure zone and a reaction zone, the method further comprising the steps of:
   recirculating a stream from the reaction zone of the nitrification reactor to the gas-exposure zone of the nitrification reactor and concentrating the recirculated stream therein with the gaseous oxidizing agent and the permeate stream,
   circulating a further stream from the reaction zone of the nitrification reactor of the nitrification reactor to a settling basin operated as denitrification means,
   recirculating a biomass-entraining stream from the denitrification means to the nitrification reactor, and
   drawing off a biologically treated stream of wastewater from the denitrification means.

4. The method according to claim 1, further comprising the step of:
   connecting the reaction zone and the gas-exposure zone of the detoxification reactor and/or the nitrification reactor by a nozzle where fluid is introduced from the inflow to the gas-exposure zone such that flow generated in the nozzle entrains fluid from the reaction zone.

5. The method according to claim 3, further comprising the step of:
   branching off a partial stream from the permeate stream downstream of the detoxification reactor during membrane filtration and recirculating it to the denitrification step directly.

6. The method according to claim 3, further comprising the step of:
   post-treating the stream of wastewater by membrane filtration.

7. The method according to claim 6, further comprising the steps of:
   separating the stream of wastewater into a biomass-containing retentate stream and a treated permeate stream,
   extracting a partial stream entraining excess sludge from the retentate stream, and,
   following separation of the partial stream, recirculating the retentate stream to the denitrification step.

8. The method according to claim 1, further comprising the steps of:
   using modules with fluid-flooded membranes for the membrane filtration step, and
   adjusting an overflow rate on the membranes by the rate of fluid flow circulated in the system.

9. The method according to claim 8, wherein ultrafiltration membranes are used for the membranes.

10. An apparatus for biologically treating coking-plant wastewater contaminated with nitrogen compounds, cyanides, phenols and sulfides, the apparatus comprising:
    a detoxification reactor including an upper reaction zone, a lower gas-exposure zone with a supply means for a gaseous oxidizing agent, and means for recirculating fluid from the reaction zone to the gas-exposure zone for removing nitrification-inhibiting pollutants,
    a device for membrane filtration of a stream of wastewater pretreated in the detoxification reactor, and
    a device including a nitrification reactor having an upper reaction zone, a lower gas-exposure zone with supply means for a gaseous oxidizing agent, and means for recirculating fluid from the reaction zone to the gas-exposure zone for biological wastewater treatment of a permeate stream occurring during nitrification and denitrification.

11. The apparatus according to claim 10, further comprising:
    respective loops for circulating fluid in the reaction zone and in the gas-exposure zone of the detoxification reactor or the nitrification reactor, and a nozzle between the two zones where recirculated fluid from the coking-plant wastewater or a pretreated stream of wastewater from the detoxification reactor entrains fluid from the upper loop conveying it to the gas-exposure zone.

12. The apparatus according to claim 10, further comprising:
a settling basin operated as a denitrification means downstream of the nitrification reactor such that a biomass-containing stream can be recirculated from the settling basin to the nitrification reactor.

13. The apparatus according to claim 12, further comprising:
a membrane filtration means for treating a stream of wastewater drawn off from the settling basin downstream of the denitrification step.

* * * * *